April 14, 1942.  G. W. KRAMER  2,279,889
CONCRETE BLOCK MACHINE
Filed Nov. 3, 1939  5 Sheets-Sheet 1

INVENTOR.
GEORGE W. KRAMER, DECEASED,
BY DOROTHY PERVAN, EXECUTRIX.

ATTORNEY

INVENTOR.
GEORGE W. KRAMER, DECEASED,
BY DOROTHY PERVAN, EXECUTRIX.

ATTORNEY

April 14, 1942.　　G. W. KRAMER　　2,279,889
CONCRETE BLOCK MACHINE
Filed Nov. 3, 1939　　5 Sheets-Sheet 3

April 14, 1942.  G. W. KRAMER  2,279,889
CONCRETE BLOCK MACHINE
Filed Nov. 3, 1939  5 Sheets-Sheet 4

INVENTOR.
GEORGE W. KRAMER, DECEASED,
BY DOROTHY PERVAN, EXECUTRIX.

ATTORNEY

April 14, 1942.  G. W. KRAMER  2,279,889
CONCRETE BLOCK MACHINE
Filed Nov. 3, 1939  5 Sheets-Sheet 5

INVENTOR.
GEORGE W. KRAMER, DECEASED,
BY DOROTHY PERVAN, EXECTRIX.
ATTORNEY

Patented Apr. 14, 1942

2,279,889

UNITED STATES PATENT OFFICE 2,279,889

CONCRETE BLOCK MACHINE

George W. Kramer, deceased, late of Kewanee, Ill., by Dorothy Pervan, executrix, Kewanee, Ill.

Application November 3, 1939, Serial No. 302,718

5 Claims. (Cl. 25—41)

The present invention relates generally to the plastic molding art and more particularly has reference to machines for molding blocks, such, for instance, as the common concrete building block. While in this specification and claims reference is made to concrete, it is to be understood that the term as herein used is intended to include other materials suitable for molding in the machine.

Machines have heretofore been devised for molding cored and solid blocks, and while machines, such as shown in Patent No. 1,594,842 granted to the present inventor, have been successful, these machines have to a certain extent been prohibitively expensive. This expense has been, to a large extent, due to the complexity of those portions effecting automatic actuation.

It is an object of the present invention to provide improvements generally in block and brick molding machines. Another object is the provision of block-forming machines which are more rapid in their operation and yet turn out just as high and in many instances higher grade blocks than those of the machines heretofore known.

An illustrative machine in accordance with the present invention is shown in the accompanying drawings in which—

Fig. 8 is a vertical longitudinal section through a portion of the carriage showing the clutch operator and governor for the spool; and Fig. 9 is a section substantially on the line 9—9 in Fig. 8.

Figure 1:
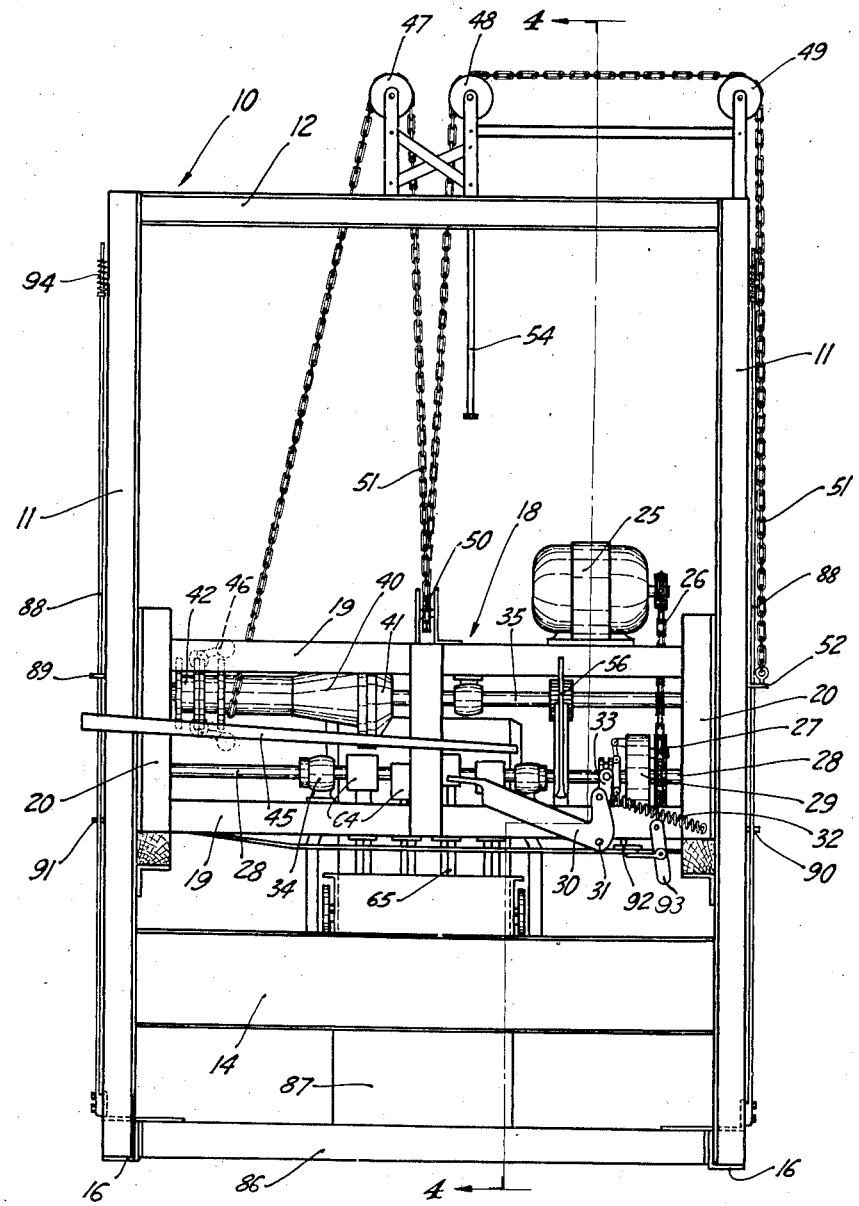
Fig. 1 is a front elevation.
Figure 2:
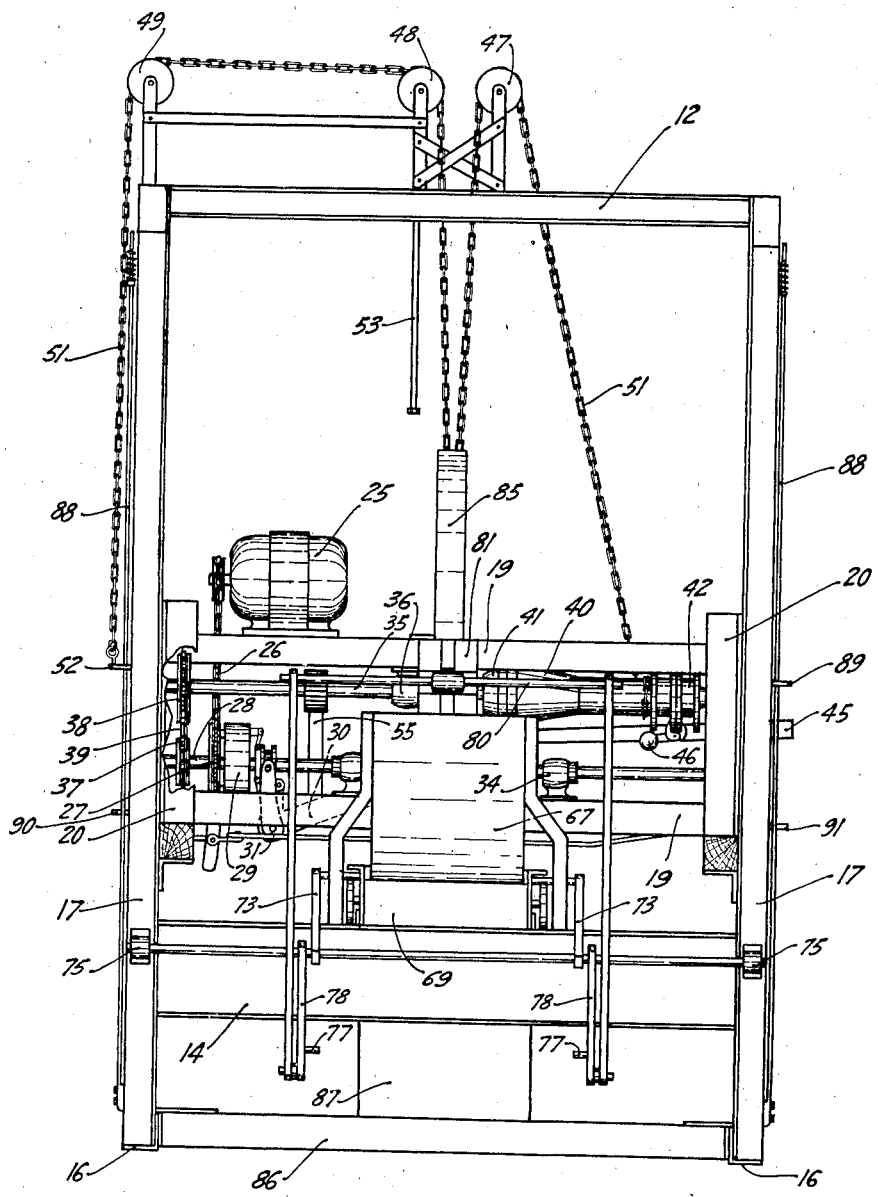
Fig. 2 is a rear elevation.

The machine, which is shown in the accompanying drawings and which illustrates the present invention, involves a main frame 10 composed of four vertical members 11, one at each corner of the machine, which serve both as supports and as guides for the operative portions of the machine, upper frame members 12 which connect the upper ends of the vertical members 11 and serve as a lift support for the operative portions, and lower frame members 14 which connect the vertical members and serve to support the mold. At each end of the frame, the front and rear vertical members 11 are connected at their upper ends by a frame member 15 and at their lower ends by a frame member 16 which extends somewhat rearwardly from the rear vertical members 11 to increase the stability of the machine. A pair of inclined frame members 17 connect the upper ends of the rear vertical members 11 with the rearward portion of the members 16. The defined main frame composed of the various described frame members may be secured together in any desired manner, by welding, riveting, or other suitable means.

A carriage 18 is guided for vertical movement by the vertical members 11, the carriage being composed of a plurality of frame members 19 which extend longitudinally of the machine with the sides of their end portions in sliding engagement with the vertical members 11. The upper and lower frame members 19 are connected by vertical frame members 20 which have flanges in sliding engagement with flanges of the vertical members 11. The frame members 19 are connected at their several ends by horizontal members 21.

The machine comprises, in general, a carriage 18, vertically guided by the main frame, which carries tamping means arranged to extend into a mold carried by the frame members 14 which, as have been described, extend between the vertical members 11 longitudinally of the machine. An elevator 23 is provided to elevate molded blocks out of the mold and is connected to the carriage to work in timed sequence therewith. The machine, further, has a material dispenser which operates in timed sequence with respect to the carriage for delivering material to the mold and for smoothing the top of the molded material.

The carriage 18 supports on its upper portion a motor 25 which supplies the power for the entire machine, the motor 25 being drivingly connected by a chain 26 to a sprocket 27 which may be engaged with or disengaged from shaft 28 by a clutch 29. The shaft 28 is carried by suitable bearings 34 in the lower portion of the carriage. Clutch-operating arm 30, pivoted at 31, is provided with a spring 32 connected to the carriage frame and to a portion of the clutch arm whereby the spring tends to turn the clutch arm in a direction to engage the clutch. An arm 33 is secured to the pivot of the clutch arm 30 and is movable with that arm. This arm 33 engages in a conventional grooved ring of clutch 29 whereby movement of arm 30 effects engagement and disengagement thereof.

A second shaft 35 is carried by bearings 36 (some of which are not shown) in the upper portion of the carriage. Sprockets 37, 38 are respectively affixed to the shafts 28 and 35, and are arranged in constant driving engagement by a chain 39. Accordingly, whenever the clutch 29 is in driving engagement, both shafts are driven by the motor 25. A winding spool 40 is rotatably carried on the shaft 35, between a pair of clutch plates 41, 42, one at each end thereof. The clutch plate 41 is fixed in position on said shaft 35, and a clutch plate 42 which is rotatable with the shaft is shiftable therealong. A pivoted gib 43 is arranged to press the clutch plate 42, as seen in Fig. 1, to the right when the gib is raised, thereby to engage the clutch faces at the two ends of the spool 40. This gib is provided with a spring 44 which turns the gib to raise it into clutch-engaging position, and is further provided with an operating arm 45 pivoted on the carriage frame and extending across the front face of the machine, which, when lowered, lowers the gib out of clutch-engaging position. Such lowering of arm 45 allows the spool to turn freely independently of the shaft 35, whereby the carriage may descend due to its own weight. Governor arms 46 are pivoted to the spool 40 at the end thereof adjacent the clutch plate 42 and are arranged so that when the spool is rotated the arms move outwardly and press the clutch plate 42 against the spool.

Sheaves 47, 48 are supported above the upper frame members 12 adjacent the middle of the machine and lie in planes parallel to the front of the machine. A third sheave 49 is supported also by the upper portion of the machine and lies in a similar plane but is located adjacent the end of the machine opposite the spool 40. Sheave 50 is connected to the upper portion of the carriage and lies in a vertical plane substantially perpendicular to the plane of the sheaves 47, 48, and 49. An elevating chain 51 is secured at one of its ends to the end of spool 40 distant from the center of the machine and passes over the spool 47, under the spool 50, over the spools 48 and 49, and along the vertical side of the machine distant from spool 40, the end of the chain being secured to a plate 52 secured to the carriage.

Starting from the position shown in Fig. 1, when the arm 45 is released whereby it is raised by spring 44, the clutches at the ends of the spool 40 engage. As the clutch 29 is normally in engagement, the shaft 35 will be constantly driven as previously described. This will effect rotation of the spool 40 whereby the chain 51 will be wound upon the spool, thereby effecting elevation of the carriage. At any time the lever 45 may be pulled downwardly with respect to the carriage to disengage the spool clutches the chain on the spool 40 is allowed to unwind under control of the governor arms 46.

A clutch actuating arm 54 is secured to the forward frame member 12 and depends therefrom in a position such that its lower end engages and operates the clutch-operating arm 30 in the uppermost position of the carriage, whereby to disengage the main driving clutch 29 when the carriage is raised.

In order to prevent unwinding motion of spool 40 by turning shaft 35 and through chain 39 the shaft 28, a stop means is provided comprising a ratchet wheel 55a fixedly secured to the shaft 35 and rotating therewith and a pawl 55 for engagement with the ratchet wheel, which pawl is mounted on the carriage frame and extends into engagement with the ratchet wheel. The pawl 55 is spring-pressed away from the ratchet wheel and is provided with an arm 56 integral therewith which engages the frame member 12 to press the pawl into engagement with the ratchet when the clutch 29 is disengaged by the arm 54.

When the carriage is raised to its uppermost position, the clutch 29 is disengaged by arm 54 and the carriage is locked in its elevated position by ratchet wheel 55a and pawl 55 until such time as the arm 33 is pulled down, by which the spool is disengaged from shaft 35.

Figure 7:
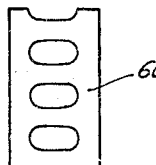
Fig. 7 shows one of the plates to close the bottom of the mold.
Figure 5:
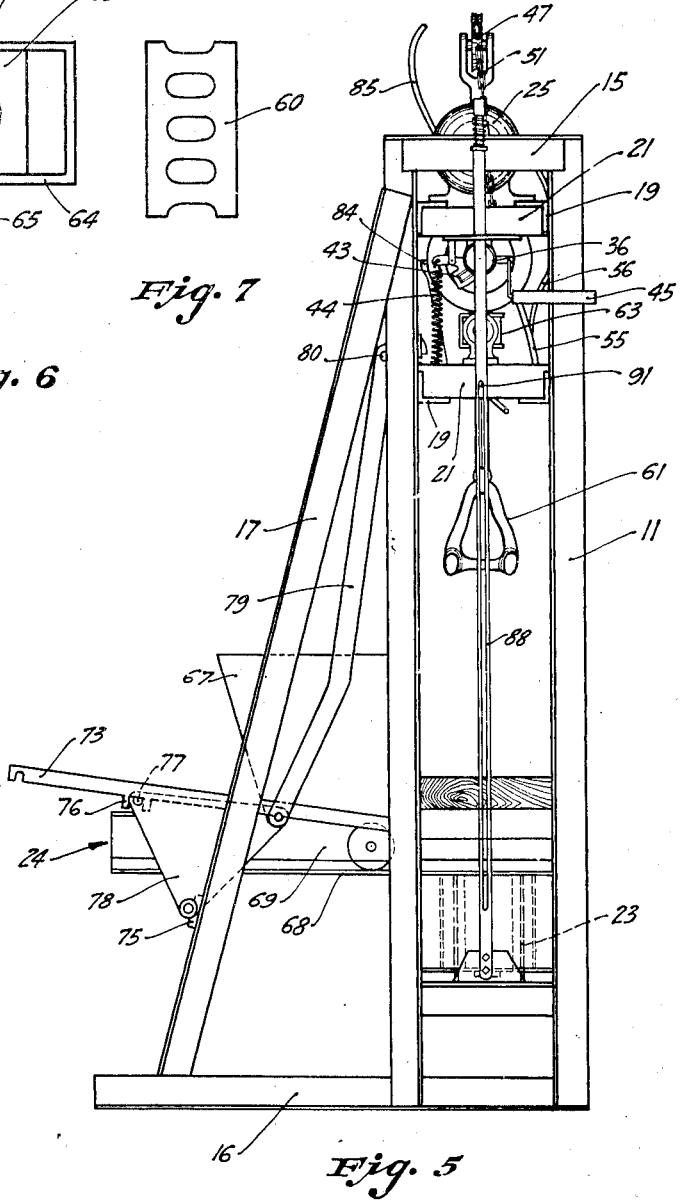
Fig. 5 is a left end elevation.

The block-forming mold 22 is carried between the frame members 14. The main portion of the mold 22 is a rectangular, vertically sided member with open top and bottom. A series of cores 58 is positioned within the member 57, the series of cores being held in place in the mold by a plate 59 secured at its ends to the bottom of the mold to which the cores are attached. The cores may be of any desired shape in order to produce the style of block it is desired to produce. Plates 60 (see Fig. 7) are provided with openings therethrough, of a shape to fit into and close the bottom of the mold with the cores extending through the openings in the plates. During molding operations, a separate plate is used with each of the blocks molded.

Figure 6:
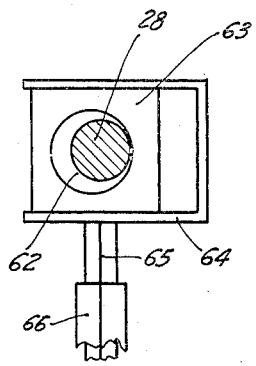
Fig. 6 is an end view of the cam structure for actuating a tamping rod.

Tamping means 61 are carried by the carriage and are operated by the lower shaft 28. For operating the tamping means, the shaft 28 is provided with a plurality of eccentrics 62 (see Fig. 6) which are journalled in bearings 63, movable horizontally in C-shaped members 64 secured to the upper ends of the tamping rods 65. The rods 65 are arranged to slide in sleeves 66 which are non-circular in section and which guide the tamping rods in their vertical tamping motion. These rods 65 move upwardly and downwardly at diverse times whereby effective action may be obtained, while the lower ends of the tamping rods may be shaped with regard to the type of cores employed to obtain the best tamping action possible.

A hopper 67, open at its top and bottom, is provided for receiving material such as concrete to be molded. The hopper is positioned so that its lower end is spaced slightly above and to the rear of the upper end of the mold. A table 68, which underlies the lower end of the hopper, has its upper surface coplanar with the upper end of the mold. A drawer 69 is arranged to slide between the lower end of the hopper and the surface of the table, the drawer having an opening 70 therethrough which, when the drawer is in rearward position lies beneath the hopper 67 and, when in its forward position, lies over the mold, whereby a limited amount of the material in the hopper may be moved into the mold. The drawer is also provided with a plate 71, arranged so that when the drawer is moved forwardly the plate closes the lower end of the hopper and prevents discharge of the remaining material from the hopper. The drawer is further provided with a smoothing plate 72 at its forward end in the opening to smooth the top of a molded block during the rearward motion of the drawer.

To operate the drawer in response to movement of the carriage, a pair of arms 73 is provided, each of which is pivotally connected at its forward end to a shaft extending longitudinally through the forward portion of the drawer, and said shaft may be employed as a support for the smoothing plate 72 in the opening 70. These arms are provided with notches 74 at the rear ends thereof facing downwardly which, when the drawer and arms are in forward position, are arranged to engage over the shaft 75 to prevent movement of the drawer. A short distance forwardly of the notches 74, the arms are each provided with a pair of pins 76, between which pins 77 on triangular lever plates 78 are adapted to engage. Triangular lever plates 78 are fixed on shaft 75 carried on the described inclined frame members 17. The distance between the pair of pins 76 and the notches 74 is equal to the distance between the shaft 75 and the pin 77. A pitman 79 is pivotally connected to the third corner of each of the triangular levers 78 and is pivotally connected at its other end to an end of the equalizer shaft 80 slidably attached to the carriage for vertical movement with respect thereto. Thus, a pair of guide plates 81 is secured in spaced vertical position at the center of the rear side of the carriage. A bearing member 82 for the shaft 80 is slidably carried by these guide plates 81, which bearing 82 is provided at its forward side, that is, within the carriage, with a hook 83 which is downwardly directed. An upwardly directed hook 84 for engagement with the hook 83 is carried by an arm 85 normally in a position in which the two hooks will engage whenever the bearing 82 is raised. The upper end of the arm 85 extends rearwardly to a position such that, during elevation of the carriage, the hook will be disengaged by the arm 85 being moved forwardly. The arm 85 should be so shaped that, at the time the drawer is moved to its rearward position, the hooks 83, 84 will become disengaged to allow further upward movement of the carriage.

The elevator 23, which is provided to raise formed blocks out of the mold, is constructed of a beam 86 extending between the ends of the machine under the mold. Any suitable devices may be provided for extending up into the mold to raise the plate 60 from its position in the bottom of the mold, such as the plates 87 which extend up into the longitudinal webs of the block. The lower end of each of the slotted rods 88 is connected to an end of the beam 86, one of which rods passes through an opening in the plate 52 and the other through an opening in the plate 89. The slots in the rods 88 extend downwardly sufficiently far that, with the rods 90, 91 in position extending into the slots, the carriage may go down to its lowermost position and upwardly sufficiently far that the carriage may be raised to a position in which the tamping means have been withdrawn from position over the mold. Subsequently thereto, the rods 90, 91 engage the upper ends of the slots, whereby the rods 88 are raised, raising the block out of the mold. The inner ends of the rods 90, 91 are pivoted to the outer ends of a lever 92, pivoted at its center point. When the lever is turned in one direction, both of the rods move outwardly and, when turned in the opposite direction, both rods move inwardly to disengage rods 90, 91 from the rods 88. A hand lever 93 is provided for turning the lever 92, the lever 93 being pivoted to the carriage and connected to the lever 92 by a link. Withdrawal of the rods 90, 91, when the elevator is in the raised position, will allow dropping of the elevator so that a plate 60 may be placed in the mold prior to operation of the machine for the formation of a subsequent block. A spring 94 is provided at the upper end of each rod 88 slidable therealong but fixed at its upper end to engage plates 52 and 89 to absorb the shock of dropping of the elevator from its raised position.

Figure 4:
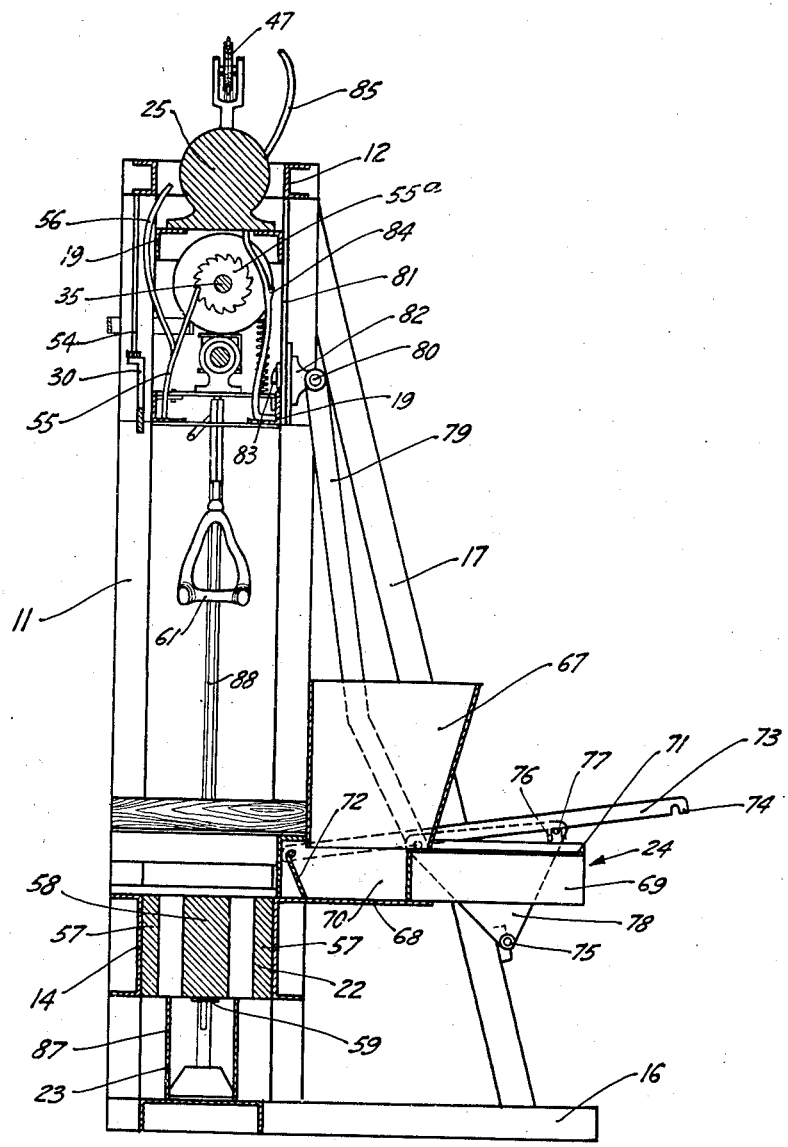
Fig. 4 is a section substantially on the broken line 4—4 in Fig. 1 except that the carriage is shown in elevated position.

When it is desired to operate the machine in the formation of blocks, starting from the position shown in Fig. 4, in which the carriage and equalizer are completely raised, a plate 60 is placed in the mold to close the bottom thereof, and concrete or like material to be molded is conveyed into the hopper. The concrete or other material drops into the opening 70 in the drawer and rests upon the table 68. The lever 45 is then pulled downwardly which allows the chain 51 on the spool 40 to unwind as the clutches at the two ends of the spool disengage. If the carriage commences to descend too fast, the governor arms 46 will engage the clutch at one end of the spool. During the first stage of the descent of the carriage, the bearing 82 and the equalizer bar 80 remain stationary and the descending guide plate 81 moves relatively thereto. When the hook 83 on the bearing 82 engages the hook 84, the bearing member 82 comes into contact with the upper portion of the carriage frame. During the next stage of the cycle, further downward movement of the carriage results in turning of the levers 78 about their shaft 75. Turning of the levers 78 effects forward motion of the drawer through the arms 73. Such forward motion will deposit the material which is in the opening 70 into the mold. The portion 71 of the drawer, when the drawer is in forward position, closes the lower end of the hopper preventing discharge of further material. This stage of the cycle terminates when the pins 77 disengage from the pairs of pins 76 and the notches 74 engage the shaft 75. Further movement downward of the carriage during the next stage of the cycle results in the tamping rods extending through the opening in the drawer down into the mold. After having tamped the block to a limited extent, it may be necessary to add more concrete to the mold, in which event the lever 45 will be allowed to rise slightly, whereby the carriage is moved up due to engagement of the clutches at the ends of the spool 40. This results in the tamping means being first removed from the opening 70 in the drawer and then the drawer being moved sufficiently to the rear to pick up as much of a charge as it is desired to deposit in the mold, following which, the lever 45 is again lowered, resulting in forward movement of the drawer and downward movement of the carriage, as heretofore described. Inasmuch as the main clutch 29 is in engagement in any lowered position of the carriage, the shaft 28 which carries the eccentric 62 is constantly rotating, resulting in vertical reciprocation of the tamping means.

Figure 3:
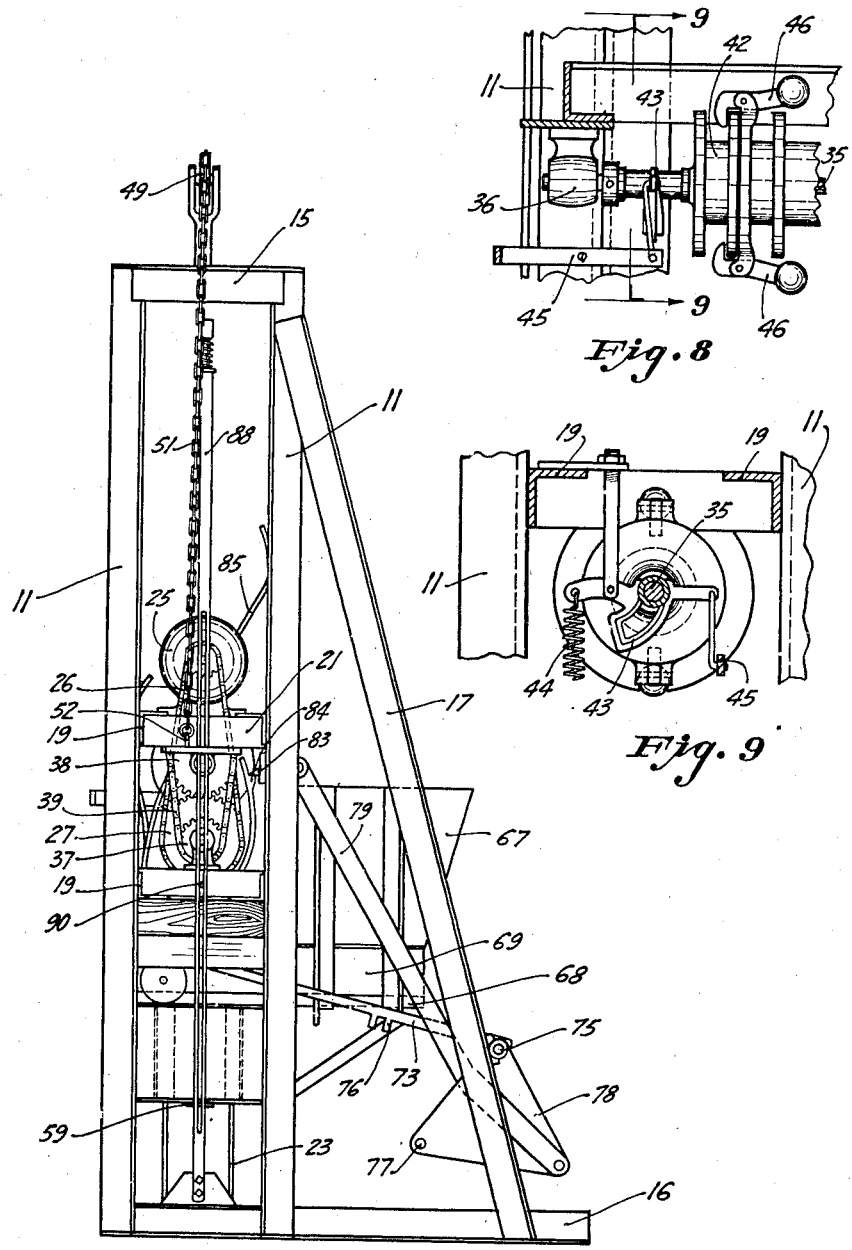
Fig. 3 is a right end elevation.

Following adequate tamping of the block, the lever 45 is allowed to rise, in which case the tamping means is first withdrawn from the mold and from the opening 70 in the drawer, followed by withdrawal of the drawer to its rearward position. During such withdrawal, the equalizer bar 80 is in its raised or latched position with respect to the carriage, as shown in Fig. 3. After complete withdrawal of the drawer, the arm 85 is actuated by the main frame, disengaging the hooks 83 and 84, allowing further upward movement of the carriage with the drawer idle. Thus, during upward movement of the carriage, the drawer is first idle, second, moved to the rear, and third, idle. During the first idle period, the tampers are removed from the mold and drawer and, during the second, the carriage actuates the elevating means. The elevator is raised by the rods 90, 91 engaging the upper ends of the slots in the rods 88. This raises the elevator sufficiently that the plate 60, with the formed block thereon, may be grasped and removed from the machine. In the uppermost position of the carriage, the clutch arm 30 operates by engagement with rod 54, to disengage the clutch 29, and the pawl 55 is moved into engagement with ratchet wheel 55a. To condition the machine for forming another block, the hand lever 93 is pulled, disengaging the rods 90, 91 from rods 88, thereby allowing the elevator 23 to drop.

While it has been stated that, during downward motion of the carriage, the equalizer bar 80 becomes latched before it starts moving down, it is to be understood that the idle period of downward movement may occur after forward motion of the carriage, depending upon the relative friction in sliding the equalizer bar upward on the carriage and in sliding the drawer forward.

Having now described this invention, what is claimed is:

1. In a block-forming machine, the combination comprising a substantially vertical guide, a carriage guided for movement thereby, a block-forming mold fixed with respect to the guide and open at its upper end, said mold being fixed below and in the line of movement of said carriage, tamping means carried by said carriage in a position to extend into the mold in a lowered position of the carriage, an elevating mechanism below said mold arranged to extend into the bottom of the mold when raised and thereby raise a block formed in the mold out of the mold, and means responsive to raising of said carriage to effect raising of said elevating mechanism after the tamping means has been removed from the mold by raising of the carriage.

2. In a block-forming machine, the combination comprising a substantially vertical guide, a mold substantially fixed with respect to said guide having an open top and bottom and closed substantially vertical sides, a carriage guided for vertical movement above said mold by said guide, tamping means carried by said carriage arranged to extend into the mold in the lowered position of the carriage, elevating means below said mold, closure means to close the bottom of said mold supported by said elevating means in the lowered position thereof, and means operatively connecting said elevating means and said carriage, allowing said carriage to be raised from its lowered position, first with the elevating means in its lowered position and then, second, causing said elevating means, after the tamping means has been elevated out of the mold, to be raised and thereby raising the closure means supported by said elevating means.

3. In a block-forming machine, the combination comprising a substantially vertical guide, a mold substantially fixed with respect to said guide, with the upper portion of said mold open and substantially horizontal, a table extending from an upper edge of the mold substantially in the plane of the upper end of the mold, a hopper to contain material to be molded having an open lower end positioned above said table, means movable between the lower end of the hopper and the table having an opening therethrough, said movable means being movable to a position with the opening registering with the upper end of the mold to deposit material in the mold, a carriage guided for vertical movement above said mold by said guide, tamping means carried by said carriage arranged to extend through said opening and into said mold, means operatively connecting said carriage to effect withdrawal of said movable means from a position above said mold after withdrawal of said tamping means from said opening upon elevating said carriage, and means to effect release of said operative connecting means following withdrawal of said movable means whereby to allow further upward movement of the carriage.

4. In a block-forming machine, the combination comprising a carriage, means for guiding said carriage in vertical movement, tamping means operatively secured to said carriage, a mold positioned below said carriage in the line of movement of said tamping means, means for delivering material to said mold through which said tamping means extends when the carriage is in lowered position, moving means operatively connected with said carriage for moving a formed block out of said mold, and coordinating means, operatively interconnecting said carriage and said delivering means and said moving means, effecting upward movement of the carriage from a lowered position to a point such that the tamping means are free of said delivering means, and then effecting withdrawal of said delivering means from the position occupied when the tamping means extended therethrough, next effecting freeing of the delivering means from further movement and then effecting movement of the block out of the mold.

5. In a block-forming machine, the combination comprising a carriage, means for guiding said carriage in vertical movement, tamping means operatively secured to said carriage, a mold positioned below said carriage in the line of movement of said tamping means, means for delivering material to said mold through which said tamping means extends when the carriage is in lowered position, moving means operatively connected with said carriage for moving a formed block out of said mold, coordinating means, operatively interconnecting said carriage and said delivering means and said moving means, effecting upward movement of the carriage from a lowered position to a point such that the tamping means are free of said delivering means, and then effecting withdrawal of said delivering means from the position occupied when the tamping means extended therethrough, next effecting freeing of the delivering means from further movement and then effecting moving the block out of the mold, and means to allow return of said moving means to its position prior to such movement independent of movement by said carriage.

DOROTHY PERVAN,
*Executrix of the Estate of George W. Kramer, Deceased.*